United States Patent
Barrientos et al.

(10) Patent No.: US 11,531,694 B1
(45) Date of Patent: Dec. 20, 2022

(54) MACHINE LEARNING BASED IMPROVEMENTS IN ESTIMATION TECHNIQUES

(71) Applicant: Amazon Technologies, Inc., Seattle, WA (US)

(72) Inventors: Ivan Barrientos, Seattle, WA (US); Pragyana Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1108 days.

(21) Appl. No.: 16/155,621

(22) Filed: Oct. 9, 2018

(51) Int. Cl.
*G06F 16/33* (2019.01)
*G06F 5/00* (2006.01)
*G06F 11/34* (2006.01)

(52) U.S. Cl.
CPC ........... *G06F 16/3338* (2019.01); *G06F 5/00* (2013.01); *G06F 11/3409* (2013.01)

(58) Field of Classification Search
USPC .............................................. 706/15; 702/18
See application file for complete search history.

(56) References Cited

U.S. PATENT DOCUMENTS

| | | | |
|---|---|---|---|
| 7,937,402 B2 * | 5/2011 | Feng .................. | G06F 16/9537 707/765 |
| 2020/0104420 A1 * | 4/2020 | Chatterjee ............. | G06N 20/00 |

\* cited by examiner

*Primary Examiner* — Paul D Lee
(74) *Attorney, Agent, or Firm* — Knobbe, Martens, Olson & Bear, LLP

(57) ABSTRACT

Systems and techniques are disclosed for machine learning based improvements in estimation techniques. An example method includes obtaining a seed specifying a portion of an action for evaluation with respect to a networked computing environment. A description of the action is completed by providing a first recurrent neural network (RNN) with the seed to generate one or more additional words, with the action represented by the description not being enabled yet in the networked computing environment. An estimated down-stream impact (DSI) associated with the action is determined based on a second RNN, with the estimated DSI indicating an estimated measure of impact to the networked computing environment which would be caused by performance of the example action after enabling the example action. Output of an interactive user interface including information representing the action and the estimated DSI is caused.

20 Claims, 8 Drawing Sheets

MACHINE LEARNING BASED IMPROVEMENTS IN ESTIMATION TECHNIQUES

BACKGROUND

Machine learning techniques are increasingly being relied upon to address problems which include complex patterns or relationships between a set of features and a particular outcome. An example problem may include determining whether an image includes a particular object. In this example problem, a machine learning model may analyze an image to predict whether the image includes the particular object. Since the particular object, such as a chair, may vary in type, appearance, color, lighting, whether it has a person on it, and so on, machine learning techniques may enable the computer system to learn indicia of the particular object. In this way, the chair may be located within the image notwithstanding with these disparate variations. Additionally, the machine learning techniques may be refined over time to improve accuracy in their estimations. Thus, machine learning techniques can provide computers with the ability to learn without being explicitly programmed, and, for example, enable adaptions to changing environments.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1A:
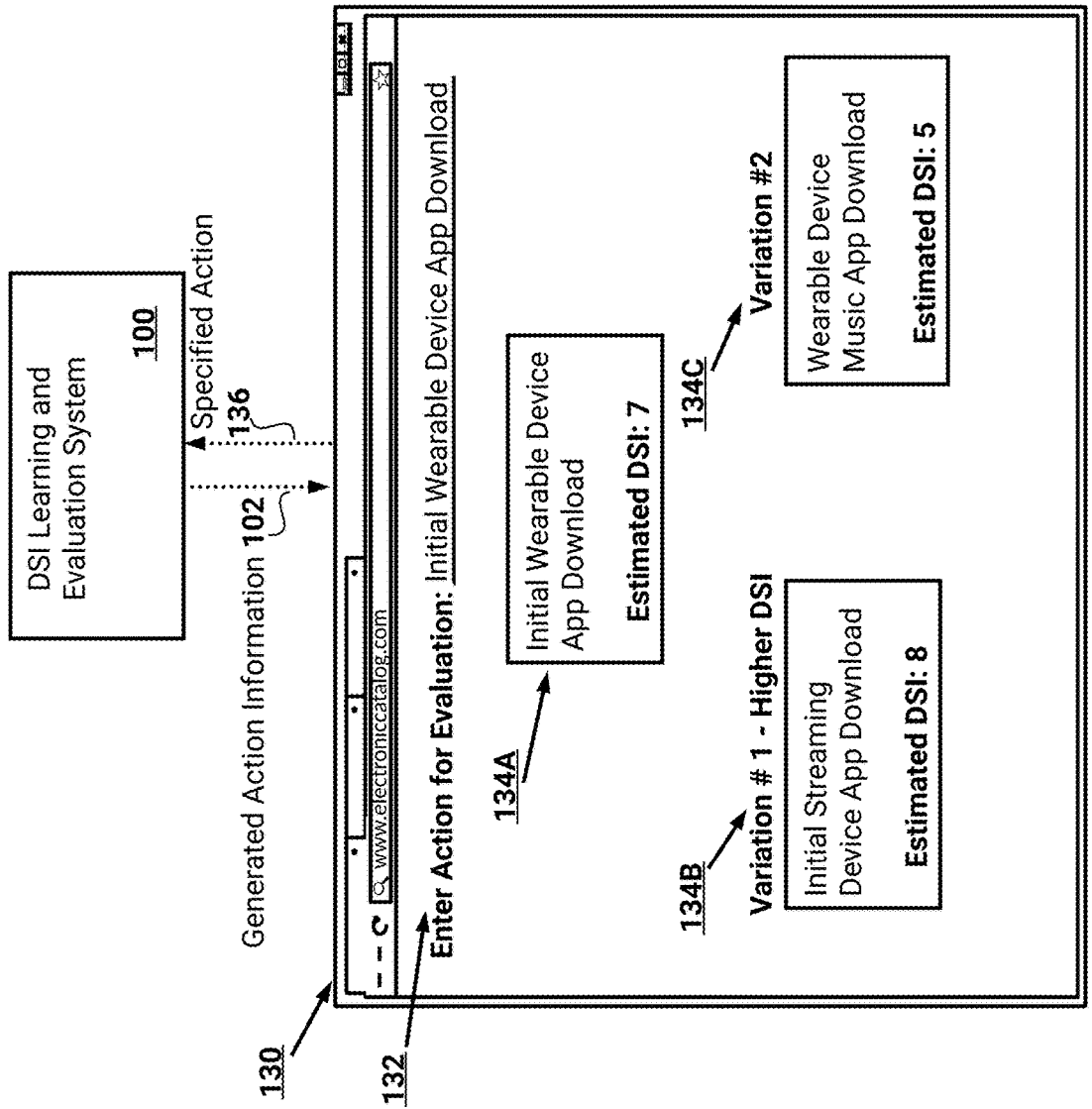
FIG. 1A illustrates an example user interface presenting estimated down-stream impacts (DSIs) of example actions.

Although particular embodiments are described herein, other embodiments, including embodiments that do not provide all of the benefits and features set forth herein, will be apparent to those of ordinary skill in the art.

Introduction

The present disclosure is generally directed to using artificial intelligence or machine learning systems to determine the incremental impact of particular events in a chain of events leading up to a target outcome, to learn the correlation between the semantic structure of descriptions of these events and the corresponding incremental impact, generate descriptions of new potential events, and predict the potential incremental impact of these new potential events. Causality is the concept that certain events can cause a particular outcome to occur or not occur. A particular outcome can be caused by multiple events leading up to the outcome. Some events may be contributory causes (e.g., one amongst several co-occurrent causes), necessary causes (e.g., outcome O would not occur without event A, but will not definitively occur because event A did occur), or sufficient causes (e.g., outcome O will occur if event B occurs). Some events may be intuitively recognizable as having a relatively high incremental impact, for example the first event in a sequence that enables a later chain of events to occur. However, due to the complexity and inter-dependence of events in a sequence, it is generally difficult or impossible to specify the particular level of causal contribution, the "incremental impact," of any given event towards a later outcome. Further, there may be events other than those in a pool of historical event data that, if enabled, would yield relatively high incremental impact towards desired outcomes.

These challenges, among others, are addressed in some embodiments by the disclosed multi-stage machine learning techniques to identify new potential user actions that may be characterized as high value actions. As will be described, these user actions may relate to actions that have been or could be performed, or otherwise initiated, by users on web pages, mobile applications, computerized personal assistants (e.g., via smart devices, such as smart speakers or appliances), and so on. As utilized herein, a user may include a person utilizing a user device. For example, the user may provide user input associated with initiating or causing, at least in part, the user actions. Additionally, a user may include a machine user, or automated intelligent user, under control of one or more computing systems. In this example, the user may automatically perform the user actions (e.g., on behalf of a person, such as in response to a voice command from the person; or without any interaction from a person).

In some embodiments, these actions may relate to interactions with respect to an electronic marketplace. Modern web pages, mobile applications, and so on, may enable thousands or millions of different actions performable by users. As an example, a particular web page or mobile application may enable functionality for users to create registries, join disparate subscription services, utilize wishlists, provide queries, purchase items, stream audio, stream video, download audio or video to mobile devices, obtain coupons, utilize coupons, set a preferred shipping carrier, message other users, transmit location information, and so on. As described herein, a high value action (HVA) represents one or more discrete actions that are associated with greater than a threshold measure of incremental impact as compared with other discrete actions. An example measure of incremental impact may include a down-stream impact (DSI), which indicates the degree to which some benefit provided by a user can be attributed to the user performing a particular action.

Thus, DSI can be a quantification of incremental impact of a particular action towards a later outcome. In the context of an electronic marketplace, an example HVA can be a user creating an item registry (e.g., a wedding registry, a baby registry) via a web page of the electronic marketplace. The user may include multitudes of items in the item registry, which may then be purchased by other users. The DSI of this action may therefore be great, as an entity operating the electronic marketplace may subsequently receive a high benefit due to the purchases of the registry items. Thus, a system associated with the electronic marketplace may desire to provide functionality that enables users to perform registry creation, among other HVAs.

Due to the complexity of causality, existing systems can lack the ability to programmatically identify actions with high DSIs. Thus at present, entities may manually identify actions which they consider to result in high DSIs, in order to enable these actions within a system (e.g., by providing user interfaces with interactive functionality that enables users to perform these actions). Some implementations of the present disclosure allow these manually identified actions (among others) to be analyzed using a machine learning model to determine their respective DSIs. To determine a DSI for an example action, the system may analyze sequences of event data from users who have performed the example action along with sequences of event data from users who have not performed the example action, or may analyze individual sequences using both factual and counterfactual modeling. Examples of events in an analyzed sequence may include purchase history, whether a user has signed up for a particular subscription service, an amount of time since the user's account was created, devices the user is known to own, and so on. A factual modeling refers to determining a probability of an outcome occurring based on a factual representation sequence of events (e.g., a representation that accounts for events as they actually occurred). A counterfactual modeling refers to determining a probability of that same outcome occurring based on a counterfactual representation of the same sequence of events (e.g., a representation that indicates that a particular event in the sequence did not occur, when that event actually did occur). Based on the difference between these probabilities, it can be possible to isolate the impact of that particular event in the sequence. For example, the featurization of a particular event can be modified to represent both that it did occur and that it did not occur. Two versions of the sequence of events, one with the "did-occur" featurization of that particular event and another with the "did-not-occur" featurization, can be separately input into the machine learning model. The resulting probabilities of the target outcome occurrence can be compared to isolate the incremental impact of that particular event on the target outcome. In this manner, one aspect of the present disclosure can learn how to determine the DSIs of particular known events or actions.

As such, these techniques operate to discover the incremental impact or DSI of actions that already exist in a pool of historical event data. These actions may be limited based on what is enabled by the underlying system. For example, in order to have "registry creation" as an action in the historical event data, an electronic catalog must enable users to create registries, such as by providing users with specific user interfaces that have specific functionalities enabling creation of a registry. It is possible that there are other feasible actions that, if enabled by the underlying system, would also have desirable DSIs. However, such actions may not be represented in historical data if they have not yet been enabled by the underlying system. Furthermore, some example actions may be possible (e.g., already enabled in the underlying system), but may not have been performed by any user. These actions also would not be represented in historical data.

Advantageously, the multi-stage machine learning techniques described herein can enable the automatic identification of new or unknown actions that are associated with DSIs greater than a threshold measure. For example, the disclosed multi-stage machine learning model can use these determined DSIs to learn the relationship between known actions' semantic structure and their corresponding DSI. For example, an action may be the first occurrence of 'a user viewing a previously downloaded video on a mobile device that lacks internet access at the time of viewing'. This action may have a high DSI as users who perform the action may subsequently rent videos to watch while commuting on a subway system, a plane, and so on. As another example, an action may be 'creation of a wishlist of movies that are not available for streaming'. This action may have a high DSI as users may purchase hard-copy versions of these movies, as they cannot be rented from a streaming service. Absent the techniques described herein however, it is unlikely these actions, included in the thousands or millions of action variations, will be surfaced.

In order to learn these relationships between semantic structure and DSI, one stage of the model ("the DSI estimation engine") can encode each word in the action as a machine-readable representation (e.g., a vector), thus representing the entire action as a collection of these representations. This representation implicitly contains much of the semantic meaning contained in the action. For example, the representation for the action "sign up for subscription A" will be numerically closer to "sign up for subscription B" than "first electronic device purchase." This DSI estimation engine can then be trained to accurately correlate an action's numerical representation with its associated DSI, such that it can predict a new action's DSI when presented with a numerical representation of that new action. Another stage of the model ("the action generating engine") can operate similarly to an auto-completion model, such that it learns to predict the final word or words of an action when presented with an initial subset of the words. For example, given the known action "create wedding registry," the action generating engine can have "create wedding" as input and be trained to predict "registry" as the target output. This model may be trained to accommodate inputs and outputs that are represented as variable-length word sequences.

In use, the action generating engine can be provided with seed phrases and generate corresponding actions, which may or may not yet be enabled in the underlying system, by completing the phrases based on its training. An example seed may specify the portion 'create wishlist'. In this example, the action generating engine may generate multitudes of actions that provide remaining words. Examples of generated actions may include 'create wishlist for movies', 'create wishlist of items for vacation', 'create wishlist of computer components', and so on. These phrases can be converted into numerical representations and provided to the DSI estimation engine, which can generate a predicted DSI for each hypothetical action. In this manner, the disclosed techniques can be used to predict new actions that may be desirable to enable on the web page or mobile application. In this manner, the disclosed techniques can be used to predict new actions that may be desirable to enable on the web page or mobile application.

As will be described, the DSI learning and evaluation system 100 can utilize a multi-stage machine learning model to generate estimates of DSIs for actions that have not yet been enabled or actions that have yet to be performed by users. This multi-stage machine learning model includes the action generating engine that feeds its output (converted into numerical representation) into the DSI estimation engine. An example machine learning model for the action generating engine and/or the DSI estimation engine may include a recurrent neural network, such as a network utilizing long short-term memory cells ("LSTM"), gated recurrent units ("GRU"), and so on.

As described above, the DSI estimation engine can be trained using DSIs of previously known actions. For example, previously known actions may be actions for which DSIs have been fully computed. As described above, a fully computed DSI indicates a DSI which has undergone extensive analysis. For example, user information has been aggregated, and counter-factual modeling applied to determine a measure of impact for an action. As will be described, these previously known actions may be converted into word embeddings. The word embeddings may then be utilized to train the example machine learning model. An example word embedding may include a vector representation of the words included in an action. Optionally, the vector representation may be generated based on example techniques, such as Word2vec, ELMo, GloVe, and so on. The vector representations may be defined with respect to a vector space with 100, 200, 1000, 2000, dimensions, and a vector assigned to each word may be based on a context of the word. Thus, vectors may be positioned in the vector space such that words which share a similar context are located in closer proximity to each other.

It should be appreciated that training machine learning models may include differing stages of training. With respect to the example of a neural network, a first stage may include training different neural networks (e.g., with different hyper-parameters) based on training datasets. These different neural networks may thus be refined based on the training datasets, such as via adjustments of weights between neurons, and so on. For the DSI estimation engine, the training datasets can include DSIs along with vector representations of the associated previously known actions. A second stage may include validation of these different neural networks. In this example stage, validation data sets may be leveraged to adjust hyperparameters of the neural networks. In a third stage, one of the neural networks may be selected for use in estimating DSIs. For example, testing datasets may be utilized to determine a neural network which best generalizes across unseen data. Some implementations may instead perform stages one and two to train a single neural network. Similar training techniques can be implemented for the action generating engine, which can be trained using training data sets including leading portions and corresponding concluding portions of known HVA descriptions. Since a long-short term memory (LSTM) neural network may advantageously preserve context amongst words in an action, for example via storing information in cells, the network may learn semantically significant context between words.

With respect to estimating DSIs of previously unknown actions, the system may rely upon deep dictionaries (e.g., a large corpus) which enable contextual understanding of words, items (e.g., products), services, and so on. As an example, an electronic marketplace may enable purchase of hundreds of thousands or millions of items, services, subscriptions, movie streams, audio streams, and so on. Due to this immense quantity of available purchase options, the electronic marketplace may uniquely maintain wide-ranging contextual information. Additionally, due to user queries, user descriptions and reviews, and so on, of the above-described purchasable items, contextual information based on user information may be obtained. Thus, if a new item is introduced the system may leverage this information to assign the item to a vector within a vector space (e.g., as described above). In this way, example actions that include previously unknown products, services, subscriptions, and so on, may be generated, and then DSIs accurately estimated.

Advantageously, the action generating engine may generate actions for evaluation by the machine learning model described above (herein referred to as 'example actions'). As an example, the action generating engine may receive a seed from a user specifying a portion of an action. The system may then generate example actions based on the portion, for example 'auto-completing' the seed. The system may utilize one or more sequence-to-sequence models to generate example actions. For example, and as will be described, an example sequence-to-sequence model may be based on a recurrent neural network. Some implementations may programmatically identify seeds without requiring specification from a user, for example based on rules specifying which parts of speech of a phrase may be considered a "seed" (e.g., verbs, gerunds, or other action-related words). For example, the system, or the action generating engine, may utilize a machine learning model to generate the seed. The action generating engine may therefore generate thousands or more example actions (e.g., based on a seed), and determine estimated DSIs for these example actions.

As will be described below, with respect to FIGS. 1A-1C, users may utilize user devices to communicate with the system described herein. For example, a user may utilize a user device to specify an example action for evaluation by the system. Example user devices may include a computer, a laptop, a mobile device, a tablet, a wearable device, a smart speaker associated with a personal assistant, and so on. As another example, the user may specify a seed (e.g., via a user interface, via voice command, and so on). In this example, the system may generate multitudes of example actions for evaluation. Through interactions with an interactive user interface on the user device, the user may quickly view estimated DSIs of evaluated actions. Optionally, the user may select certain evaluated actions and cause full computations of DSIs to be performed.

The user may also cause a particular action presented in an interactive user interface to be monitored by the system. The system, or a different system, may then monitor aggregated user input and actions for occurrences of the particular action. For example, different storage systems may store different actions by users. As an example, a first storage system may store information identifying viewing histories of users with respect to items available in an electronic marketplace. A second storage system may store information identifying item purchases made by users. A third storage system may store information identifying video downloads, video streams, and so on made by users. If the particular action indicates, 'purchase of video stream based on initial viewing of video item page', the system may aggregate across these storage systems to determine occurrences of the particular action. For example, the system may identify prior occurrences, and also monitor for future occurrences.

In this way, the system described herein addresses technological problems related to identifying actions of users that result in a high measure of impact for an entity. As described above, an impact of certain actions may not be knowable since the actions may yet to have been performed. Based on the techniques described herein, an entity may automatically have thousands, hundreds of thousands, and so on, actions evaluated for impact. In this way, the entity may obtain measures of impact for actions involving unreleased items, services, and so on. Additionally, given the extent to which different combinations of actions may be available to users, the current schemes to determine impact are computationally inadequate to assess these combinations. In contrast, the techniques described herein can enable rapid evaluation of these combinations.

While the above description has focused on an electronic marketplace, it should be appreciated that the techniques described herein may be otherwise applied. As an example, the techniques may be applied to network security. In this example, the system described herein may utilize machine learning models trained on user actions with respect to networked computer systems. Measures of impact (e.g., down-stream impact) may be assessed for combinations of user actions, with the measures of impact indicating a potential risk to a network. For example, an example user action may include accessing a user account from a first location (e.g., based on an IP address) and then accessing the user account from a second, different, location. In this example, it may be impossible for a person to have traveled fast enough between the first and second location to access the user account. This may indicate that the user account has been compromised. As another example, a user action may include the access rights of a particular user account suddenly being increased (e.g., updating an access control list). In this example, the user action may reflect, 'increase access rights of user account of employee whose role is not assigned such access rights'. The system may generate measures of impact for these example actions, and similarly train a neural network based on the actions. In this way, the system may generate example additional actions and estimate measures of impact for these example actions. Through surfacing actions with high estimated measures of impact, the system may flag previously unknown actions that may indicate great risk to network security.

Example User Interfaces

FIG. 1A illustrates an example user interface 130 presenting estimated down-stream impacts (DSIs) 134A-C of example actions. As described above, the DSI learning and evaluation system 100 may evaluate user actions and generate estimated DSIs for the user actions. A user action, as described herein, may be broadly interpreted to encompass combinations of discrete events performed, or otherwise caused, by users with respect to computer systems, networks, user devices, and so on. For example, a discrete event may relate to downloading of an application, a movie, an audio file, and so on. As another example, a discrete event may relate to subscribing to a particular service, setting preferences in a user profile, providing search queries, listening to a stream of audio, purchasing an item, causing a virtual machine to execute a particular web-based application, and so on. As another example, a discrete event may relate to interaction with a widget presented on a mobile device or web page, interaction with a toolbar included in a browser, interaction with a personal assistant via a smart speaker or mobile device, and so on.

The user action may indicate combinations of these events, with each combined event optionally occurring at distinct times. As an example, a user action may include, 'create wishlist of movies not available via streaming service'. In this example, the discrete events may include the creation of a wishlist at a first time. The discrete events may also include the user including movies in the wishlist at a second time. Thus, the user action may be satisfied upon the user performing the all of the discrete events included in the user action.

As illustrated in FIG. 1A, an example user interface 130 is presented. For example, the user interface 130 may be an example of a web page generated, at least in part, by the DSI learning and evaluation system 100. Optionally, the DSI learning and evaluation system 100 may implement a web application which responds to user input provided to a web page. For example, the DSI learning and evaluation system 100 may receive user input provided to user interface 130, and generate updated user interface information based on the user input. The DSI learning and evaluation system 100 may then cause the web page to be updated accordingly. Optionally, and as will be described, a user device presenting the user interface 130 may generate the user interface 130. In this example, the user device may execute an application (e.g., an 'app' obtained from an electronic application store) which generates the user interface 130.

The user interface 130 includes a first input portion 132. A user of the user interface 130 may provide user input to the first input portion 132 to specify an action to be evaluated by the DSI learning and evaluation system 100. As will be described in more detail below, the DSI learning and evaluation system 100 may rapidly generate an estimated DSI for the specified action. As described above, a DSI may represent a measure of a benefit provided to an entity which is assignable to a user performing an associated action. The measure may be determined via aggregating information from thousands or hundreds of thousands of users who performed the associated action. In this way, the DSI may indicate a value associated with performance of the action.

As illustrated in FIG. 1A, a user has provided user input to specify the action, 'Initial wearable device app download' as the action to be evaluated. Examples of user input may include interaction with a keyboard (e.g., physical keyboard, virtual keyboard), a mouse, providing speech to a microphone of a user device, touch-screen input, and so on. The specified action 136 may be transmitted to the DSI learning and evaluation system 100. For example, a user device presenting the user interface 130 may transmit the specified action 136 via a network (e.g., the internet).

In response to the received specified action 136, the DSI learning and evaluation system 100 can generate action information 102. As illustrated in FIG. 1A, the action information 102 may be updated to include a first output portion 134A in which an estimated DSI for the specified action 136 is specified. In the example, the estimated DSI may be '7'. Optionally, DSI may be measured according to a particular scale (e.g., from 1-10, such as a decile scheme). Thus, the DSI presented may quickly indicate to a user the estimated impact associated with the specified action 136.

Optionally, the DSI learning and evaluation system 100 may generate variations of the specified action 136. As will be described, the DSI learning and evaluation system 100 may utilize one or more machine learning models to generate words which may replace, or be included as additions to, words in the specified action 136. In the illustrated example, the DSI learning and evaluation system 100 has determined two example variations 134B-C of the specified action 136. Optionally, the DSI learning and evaluation system 100 may determine a threshold number of variations (e.g., a user-specified threshold) and present the variations in the user interface 130 (e.g., a user may scroll down in the user interface 130). Optionally, as the user scrolls down the user interface 130, the DSI learning and evaluation system 100 may generate additional variations and include them in the user interface 130.

The first variation 134B included in the user interface 130 is indicated as having a higher DSI than the specified action 136. For example, the first variation 134B includes the action, 'initial streaming device app download'. As compared to the specified action 136, the DSI learning and evaluation system 100 has determined that the estimated DSI of an initial streaming device app download is greater than that of a wearable device app download. Advantageously, the user interface 130 may highlight, or otherwise flag, that the first variation 134B is associated with a higher estimated DSI than the specified action 136. For example, the user interface 130 may present the portions 134A-134C in colors based on the estimated DSIs indicated in the portions 134A-134C. In this example, the first variation 134B may be assigned a different color than the assigned color of portion 134A. The second variation 134C included in the user interface 130 is indicated as having a lower DSI than the specified action 136. For example, the second variation 134C includes the action, 'wearable device music app download.' As compared to the specified action 136, the DSI learning and evaluation system 100 has determined that the downloading a music app is associated with a lower estimated DSI than the initial download of an app.

In some embodiments, a user of the user interface 130 may toggle on or off the presentation of variations 134B-13C. Optionally, the user may indicate that only variations which are associated with higher estimated DSIs than a specified action are to be presented. Similarly, the user may also indicate that only variations of a certain type are to be presented. For example, the user may enable variations that are required to utilize a same verb (e.g., or synonymous verb). With respect to the example of FIG. 1A, the user may indicate that only variations which include an 'app download' are to be presented. Thus, the DSI learning and evaluation system 100 may filter (e.g., remove) generated actions which do not include the same, or synonymous, verb. As another example, the user may enable variations that require at least a threshold number of the words in the specified action 136 (e.g., a threshold percentage of the words). As another example, the user may enable variations that are constrained according to length. In this example, the user may indicate that variations are not to be generated which include greater than a threshold number of words. Thus, the user may avoid overly specific actions.

As will be described in more detail below, with respect to FIGS. 1B-1C, a user of the user interface 130 may cause one or more of the presented actions to have full DSI computations performed. For example, the user may interact with user interface 130 to request that the first variation 134B have a DSI fully computed. As described above, since this computation may consume a relatively large amount of time (e.g., 12 hours, 2 days, and so on), the DSI learning and evaluation system 100 may be alert the user when the computation is completed. Example alerts may include notification via email, via a push to an application executing on one or devices of the user, and so on. In this way, the user may view the accurately determined DSI for the first variation 134B.

Figure 1B:
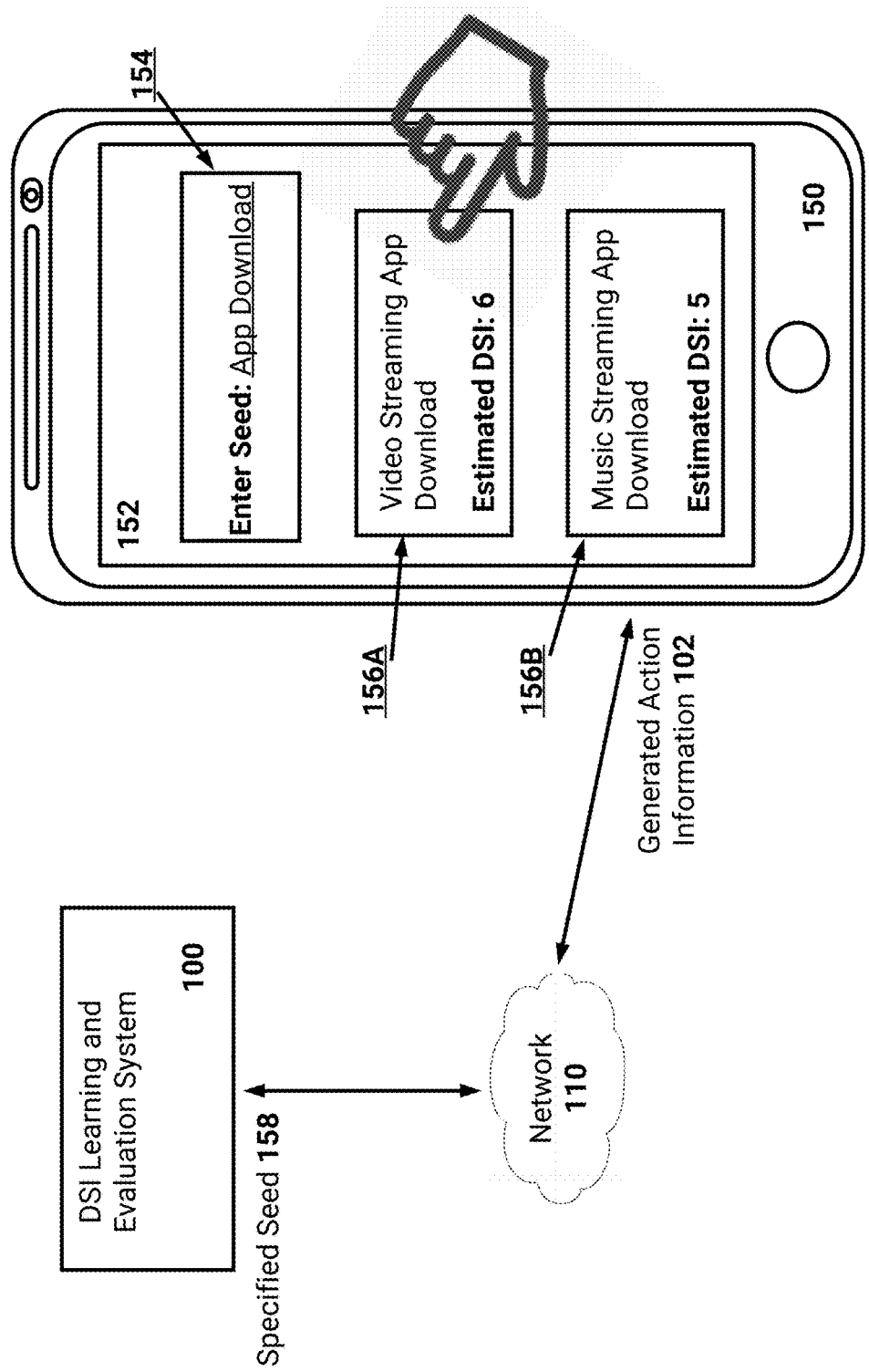
FIG. 1B illustrates another example user interface presenting estimated DSIs of example actions.

FIG. 1B illustrates another example user interface 152 presenting estimated DSIs of example actions. As described above, with respect to FIG. 1A, the DSI learning and evaluation system 100 may cause presentation of evaluated actions in a user interface accessible to a user. For example, the user may specify an example action and the system 100 may estimate a DSI associated with the example action. In the example of FIG. 1B, a user is utilizing a mobile device (e.g., a smart phone, a tablet, a wearable device) which is presenting user interface 152. The mobile device may optionally execute an application (e.g., an 'app') which communicates with the DSI learning and evaluation system 100 via a network 110 (e.g., the Internet). The application may include user interface information for rendering by the mobile device 150. As will be described, the application may present information received from the DSI learning and evaluation system 100. Examples of the information may include the generated action information 102 described above.

In addition to specify an action for evaluation by the DSI learning and evaluation system 100, the user may specify a seed. For example, user interface 152 includes a first input portion 154 in which the user can specify the seed. In the illustrated example, the user has specified 'app download'. As will be described in more detail below, the DSI learning and evaluation system 100 may generate one or more example actions based on the seed. The generated example actions may include different words which contextually align with the seed. The DSI learning and evaluation system 100 may leverage a machine learning model, such as a neural network, to generate these remaining words.

As illustrated, the specified seed 158 has been transmitted to the DSI learning and evaluation system 100. In response, the DSI learning and evaluation system 100 has generated action information 102 for presentation via the user interface 152. As described above, the action information 102 can comprise estimated DSIs for example actions generated based on the seed 158. For example, a first output portion 156A includes example action, 'video streaming app download'. For this example action, the DSI learning and evaluation system 100 has determined an estimated DSI of 6. As another example, a second output portion 156B includes example action, 'music streaming app download'. For this example action, the DSI learning and evaluation system 100 has determined an estimated DSI of 5. Optionally, the user may provide user input to the user device 150 causing the user interface 152 to be scrolled downwards. For example, the user device 150 may respond to touch input, and the user may scroll downwards. As the user scrolls, the user interface 152 may update to reflect estimated DSIs of additional example actions.

Similar to the above description of FIG. 1A, the example actions generated based on the seed 158 may be constrained. As an example, a maximum number of words to be included in an example action may be limited. In this example, the user of the user interface 152 may specify the maximum (e.g., 5, 6, and so on), or a default maximum may be utilized. Optionally, the default maximum may be based on a likelihood associated with users performing the action. For example, if the number of words is too great then the likelihood that a meaningful number of users have, or will have, performed the action is reduced.

In some embodiments the maximum may be based on the seed 158. For example, certain seeds may lend themselves to an increased number of words as compared to other seeds. The example seed 158 specified in the first input portion 154 may, as an example, be associated with a reduced number of words as compared with some other seeds. Since the example seed 158 indicates an app download, the generated actions may characterize a type associated with the app (e.g., video, music, and so on). However, in some embodiments the specified seed 158 may not be associated with a reduced number of words. For example, the DSI learning and evaluation system 100 may generate actions which further provide context for an app being downloaded. While not illustrated, another example action may therefore be, 'Marketplace App Downloaded while located in third-party physical store'. This action may indicate that the user downloaded an app to purchase items while located in a physical store (e.g., location information associated with the mobile device 150 may be utilized).

The user interface 152 may respond to user input, for example the user may touch a touch-screen of the user device 150. As will be described below, with respect to FIG. 1C, the touch may indicate that the user is to perform additional functionality related to an example action. Example functionality may include causing a full computation of a DSI, and causing monitoring of the example action. Optionally, the example functionality may include a request for more detailed information related to an example action. For example, the user may press on the first output portion 156A with a particular force or pressure (e.g., within a certain range), or press on the portion 156A for greater than a threshold amount of time. In response, the user interface 152 may update to reflect more detailed information.

Examples of more detailed information may include an indication of a number of users who have, or will have, performed the action. While the action may not, at the time of interaction, be monitored for, the DSI learning and evaluation system 100 may generate an estimate. For example, the estimate may be based on the machine learning model utilized to generate the example action. Since the machine learning model was trained using actions performed by users, the system 100 may generate an estimate of a likelihood that users have, or will have, performed the example action. This estimated likelihood may be based on the semantic context between the words (e.g., a likelihood the words may be included in a same action), along with a frequency with which the words appear in actions performed by users. An example action may include, 'subscribe baby diaper service'. For this example action, there may be no such service. However, the DSI learning and evaluation system 100 can determine the likelihood based on a number of users who purchase baby diapers and a number of users who subscribe to disparate services.

Figure 1C:
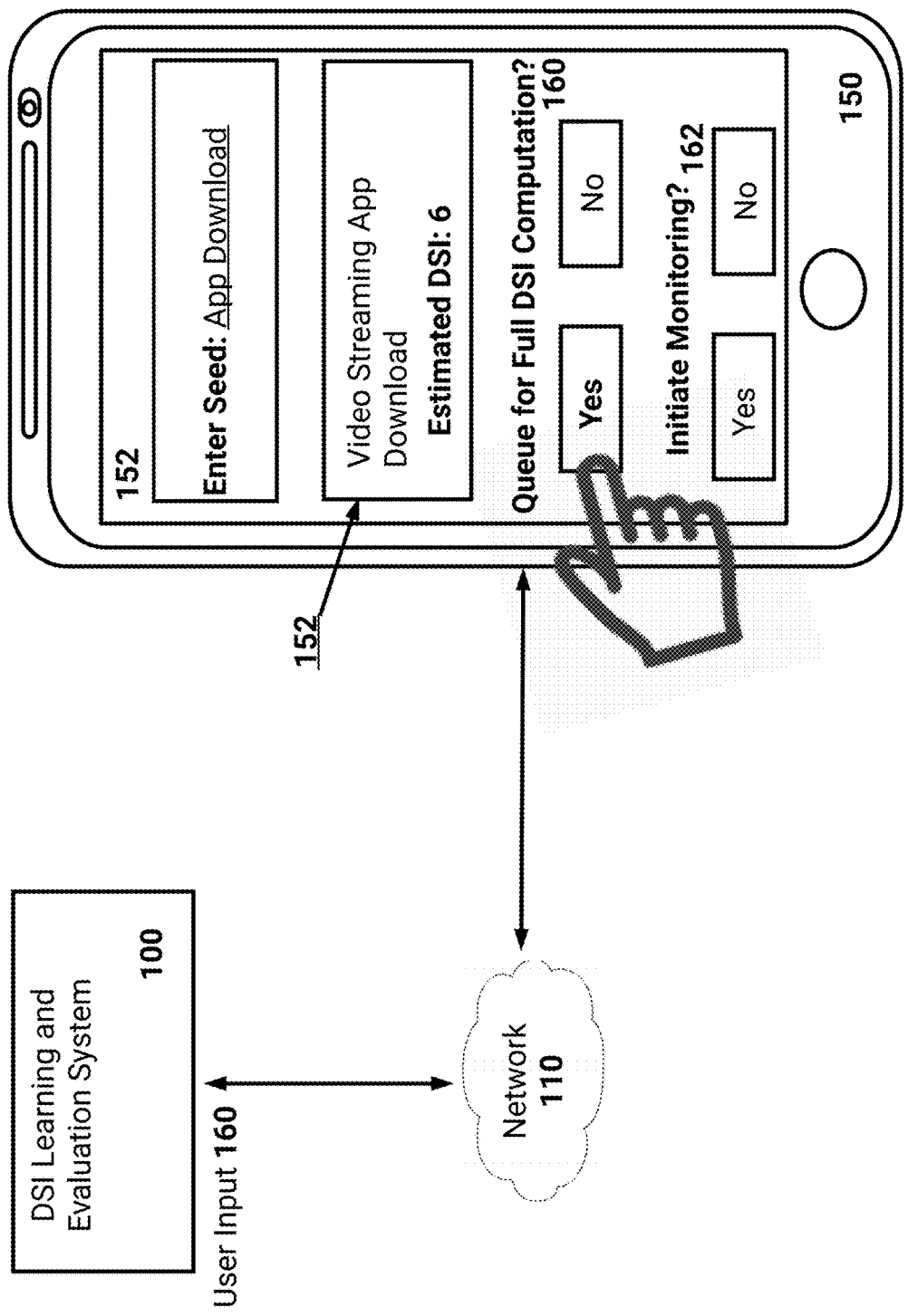
FIG. 1C illustrates another example user interface presenting estimated DSIs of example actions.

FIG. 1C illustrates another example user interface 152 presenting estimated DSIs of example actions. As described in FIG. 1B, a user of user interface 152 may provide user input 160 to select a particular example action. As illustrated, the user selected the example action specified in the first output portion 152. Upon selection, the user interface 152 has updated to include additional functionality to be performed by the DSI learning and evaluation system 100.

The first example functionality 160 includes causing a full DSI computation to be performed by the DSI learning and evaluation system 100. The user may select a 'Yes' selectable option or a 'No' selectable option. In response to selection of the 'Yes' selectable option, the DSI learning and evaluation system 100 may queue the full DSI computation. Optionally, the system 100 may cause a compute cluster to perform the computation. Optionally, the system 100 may require that a threshold number of users consent to the computation. For example, the system 100 may transmit information to one or more other users to confirm that the computation is to be initiated.

The second example functionality 162 includes causing the DSI learning and evaluation system 100 to monitor for occurrences of the example action. In the example of FIG. 1C, the DSI learning and evaluation system 100 may therefore aggregate user information to identify unique occurrences of users downloading a video streaming app. Optionally, the DSI learning and evaluation system 100 may analyze stored information to identify prior occurrences of the example action. Additionally, the DSI learning and evaluation system 100 may monitor for future occurrences of the example action. In this way, the DSI learning and evaluation system 100 may generate information identifying that particular users have performed the example action. Without being constrained by application, it should be appreciated that occurrences of the example action may be utilized to motivate users to perform additional actions. With respect to the example action of, 'video streaming app download', the users may be nudged to utilize the app, purchase streaming videos, and so on. For example, advertisements or incentives may be provided to the users via the application, via a web page, and so on.

Example Block Diagrams

Figure 2A:
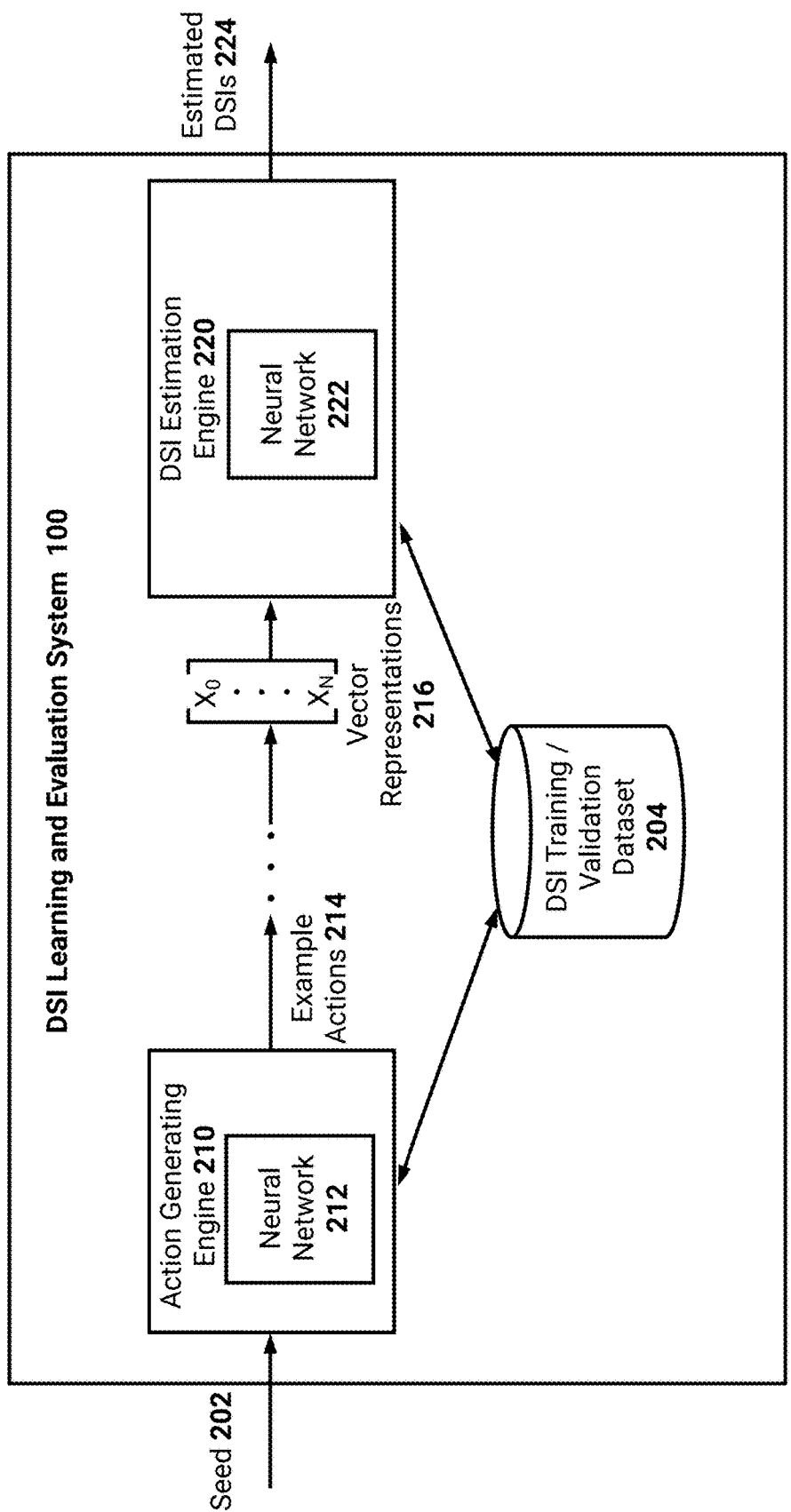
FIG. 2A illustrates an example DSI learning and evaluation system.

FIG. 2A illustrates an example down-stream impact (DSI) learning and evaluation system 100. The DSI learning and evaluation system 100 may be an example of a system of one or more computers, one or more virtual machine executing on a system of one or more computers, and so on. As described above, the DSI learning and evaluation system 100 may cause presentation of a user interface on a user device. Example user interfaces are described above, with respect to FIGS. 1A-1C.

As illustrated, the DSI learning and evaluation system 100 includes an action generating engine 210 and a DSI estimation engine 220. While the example of FIG. 2A indicates that engine 210 and 220 are included in the system 100, it should be understood that these engines may be executed by different systems. For example, a first cluster of systems may perform the functionality enabled by the action generating engine 210. This first cluster of systems may store generated example actions 214 for access by a second cluster of systems. The second cluster of systems may then perform the functionality enabled by the DSI estimation engine 220. Advantageously, since there may, as an example, be no dependencies between generated example actions, estimated DSIs may be generated in parallel (e.g., substantially in parallel). With respect to the example of the second cluster of systems, each included system may perform parallel computations (e.g., in different processes or virtual machines). Thus, a speed at which DSIs may be estimated can be enhanced.

The action generating engine 210 may, as will be described below, generate example actions 214 for evaluation by the DSI estimation engine 220. For example, the action generating engine may receive a seed 202 reflecting a portion of an action. Optionally, the DSI learning and evaluation system 100 may implement a third machine learning model (e.g., a recurrent neural network), or utilize the action generating engine 210, to generate the seed 202. The action generating engine 210 may then generate different combinations of words to include with the seed 202. These resulting combinations may be provided as the example actions 214 to the DSI estimation engine 220. The DSI estimation engine 220 may, as will be described below, determine estimated DSIs for each of the example actions 214. For example, the DSI estimation engine 220 may utilize a neural network 222 to rapidly estimate the DSIs. Thus, the engine 210 and engine 220 may advantageously rapidly generate, and then evaluate, actions which users may perform. In this way, actions which result in a high measure of impact (e.g., high value actions, such as actions with a DSI greater than a threshold measure) may be surfaced.

The action generating engine 210 includes one or more sequence-to-sequence models, such as machine learning models, which in the example is indicated as being a neural network 212. The neural network 212 may be a recurrent neural network (RNN), such as a long short-term memory (LSTM) network. It should be appreciated that neural networks may advantageously be utilized to estimate remaining words given a portion of a sentence or phrase. The neural network 212 may be trained utilizing information obtained from the DSI training/validation dataset database 204. The database 204 may store information aggregated from different systems which are configured to interact with users. For example, the systems may record information reflecting actions taken by users with respect to a web application, a web page, a mobile application, a widget presented on user devices of the users, verbal input provided by users to personal assistants. The database 204 may further reflect user queries, such as searches performed on an electronic marketplace. In this example, a user query may indicate a desired action (e.g., 'create wishlist for wedding') or outcome. The database 204 may further reflect comments or other text provided by users. For example, the comments may be related to particular items or services. As another example, the comments may be provided on message boards, blogs, and so on.

The information recorded in the DSI training/validation dataset database 204 may be aggregated into distinct actions. For example, the database 204 may indicate actions which have previously been identified (e.g., identified for monitoring). These actions may thus provide a baseline context. The action generating engine 210 may encode these actions into vector representations, for example based on Word2vec. Since the encoded vector representations may preserve context and semantic meaning, the engine 210 may train the neural network 212. As an example, the engine 210 may generate input and output weight matrices, which may depend upon the input encoded vector representations and output target words (e.g., via a hidden layer of the neural network 212). However, since the number of previously identified actions may be limited, the engine 210 may advantageously generate additional actions. For example, the engine 210 may access a corpus, or dictionary, identifying contextual/semantic information associated with the actions. In this example, the engine 210 may modify a previously identified action to include a different word with a similar context or semantic meaning as a word included in the identified action. As an example, the engine 210 may generate a new action of, 'set wedding gift reminder' based on the previously identified action of, 'set birthday gift reminder'.

Furthermore, the action generating engine 210 may aggregate information to determine actions performed by users. As an example, the database 204 may indicate that users have performed a series of actions close in time to each other. In this example, a series of actions may include the user generating a wishlist and then including an item in the wishlist. Thus, since these actions are linked in context (e.g., relating to a wishlist) the engine 210 may determine that this is an available action.

Thus, the action generating engine 210 may utilize the trained neural network 212 to estimate words that can be included with the seed 202. As described in FIG. 1A, the engine 210 may limit a number of words which are to be included in an example action 214. For example, the engine 210 may allow that up to 4 additional words may be included with the seed 202. As illustrated in FIG. 2A, the action generating engine 210 has generated example actions 214 for evaluation by the DSI estimation engine 220. Optionally, the output of the action generating engine 210 may be the vector representations 216 of the example actions 214. Optionally, the DSI estimation engine 220, or a different system or engine, may generate the vector representations 216.

As described above, the vector representations 216 may be generated utilizing one or more example word embedding schemes, such as GloVe. Optionally, each word included in an example action may be converted into a vector representation. Subsequently, the DSI estimation engine 220 may evaluate the vector representations associated with an example action, and assign a value corresponding to its estimated DSI. For example, the value may be an integer, such as between a certain range (e.g., 1-10, 1-100), a floating point number, a label (e.g., high, medium, low, and gradations thereof), and so on. It should be appreciated that a word embedding may be an array of numbers (e.g., floating point values) that is derived from text. As an example, an example action of, 'sign up for subscription-service-A' may yield four vector representations (e.g., vectors for: sign, up, for, subscription-service-A). In this example, a piece of text is a word of interest, such as "subscription-service-A". The process of representation may refer to collecting thousands, hundreds of thousands, and so on, of words and forming an embedding for each word. In order to build the representation process, the DSI learning and evaluation system 100 may, as an example, construct a look-up table that keeps track of how many times a word occurs in relationship to other words (e.g., co-occurrence). The intuition behind co-occurrence is that the meaning of a word, e.g. its semantics, can be understood by words that often occur to the left and right of it. This approach is then able to model relationships such as analogies. With respect to the example of 'subscription-service-A', an electronic marketplace may uniquely have sufficient uses of this word to generate such a look-up table. For example, user searches or queries, item descriptions, and so on, may be leveraged to determine context, meaning, closest analogues, and so on, of this word.

The DSI estimation engine 220 includes one or more machine learning models, which in the example is a neural network 222. The neural network 222 may be an example of a recurrent neural network, such as a network with long short-term memory cells, gated recurrent units, and so on. As described above, the DSI estimation engine 220 can determine estimated DSIs 224 for the example actions 214. For example, the vector representations 216 may be ingested by the DSI estimation engine 220 and estimated DSIs 224 generated based on the representations 216. These estimated DSIs 224 may then be analyzed by the DSI learning and evaluation system 100 to identify whether any exceed a threshold. As will be described in FIG. 3, the system 100 may then perform a full DSI computation for actions associated with the identified DSIs. Additionally, one or more of the estimated DSIs 224 may be provided for presentation in a user interface presented on a user device.

Similar to the above description, the neural network 222 may be trained using the DSI training/validation dataset database 204. The database 204 may reflect actions which have previously been identified and their associated DSIs. These DSIs may be full computations, for example based on aggregated user information of users who performed the actions. Thus, the neural network 222 may be trained to learn the correlation between words included in an action and the associated DSI.

Figure 2B:
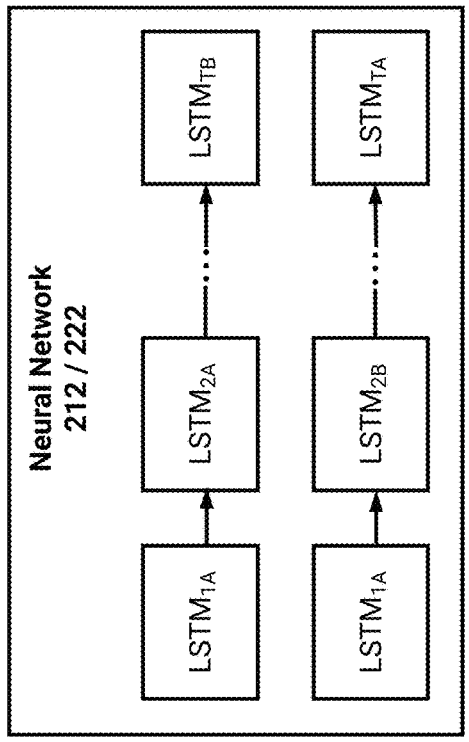
FIG. 2B illustrates an example machine learning model implemented by the DSI learning and evaluation system.
Figure 2B:
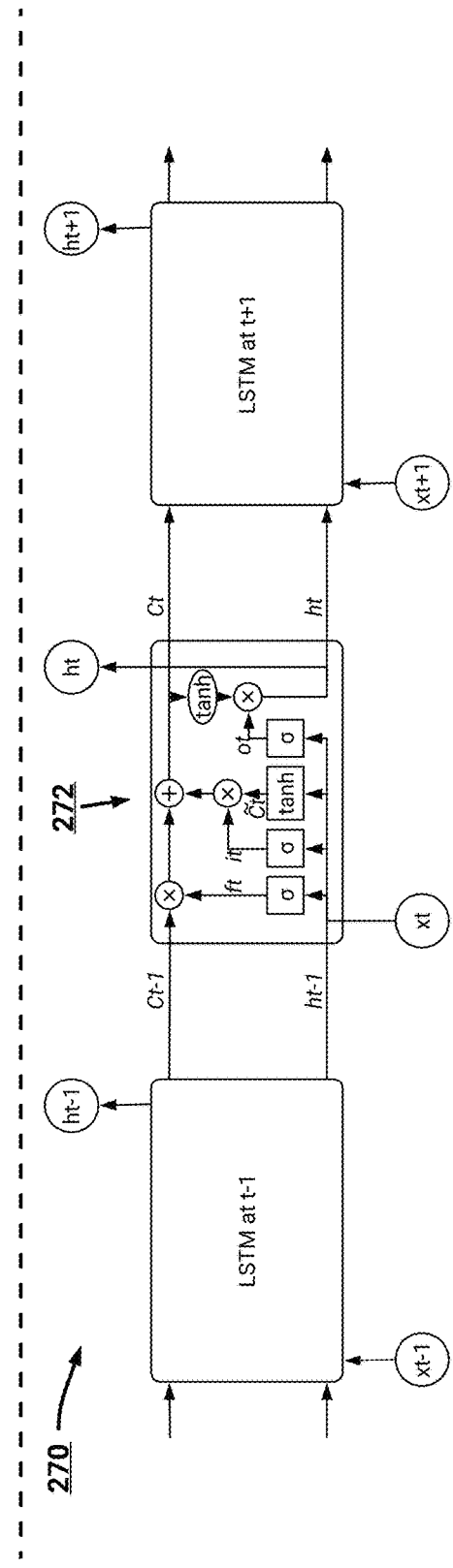

FIG. 2B illustrates an example machine learning model 222 implemented by the DSI learning and evaluation system 100. While reference below will be made to the DSI estimation engine 220, and neural network 222, it should be understood that the features described herein may be applied to the action generating engine 210 and neural network 212. As illustrated in portion 260, the neural network (e.g., network 212 or 222) includes a number of long short-term memory (LSTM) blocks. The LSTM may be considered as a type of neural network designed to efficiently model sequence-to-sequence tasks. For example, tasks for which the input is a sequence, such as words, and the output is another sequence, such as new words. An example of a typical sequence-to-sequence task is speech recognition where the input is a sequence of sounds (acoustic signals) and the output is the corresponding sequence of words (strings). LSTMs may be advantageously utilized here as they can find grammatical patterns in text and subsequently correlate these patterns with target outputs.

In particular, this type of neural network is designed to keep track of how much importance to assign to the beginning, middle, and end of a sequence. With respect to the neural network 222, the parts of an input example action may be divided into the separate words of the action (e.g., while preserving order). Each word forms a time step corresponding to the beginning/middle/and end of the keyword. The importance of each such time step is determined by its correlation with the target output.

As an example, an LSTM memory block may include a memory cell and three multiplicative gates which regulate the state of the cell. The memory cell encodes the knowledge of the inputs that have been observed up to that time step, a forget gate controls whether the old information should be retained or forgotten, an input gate regulates whether new information should be added to the cell state, and an output gate controls the flow of the cell state to the output. LSTM networks are made deep by stacking multiple such memory blocks. In the illustrated embodiment, each event has two associated LSTM blocks depicted in a column above that event. This can be equated with the neural network 222 having two "layers" of memory blocks, with each layer forming a number of columns corresponding to the number of events. The structure of the neural network 222 may be dynamic to accommodate different numbers of events in a sequence, or in alternate embodiments the structure of the neural network 222 may be fixed and input data can be standardized to include a predetermined number of events corresponding to the number of columns in the neural network 222. Though shown with two LSTM block layers, the neural network 222 can include three or more layers of LSTM blocks in other implementations.

Data flows through the neural network 222 by moving upward through the layers along each column and by moving forward along a layer across the columns. Forward here refers to data flowing in a direction moving from the column of the first event 1 towards the column of the last event T. Thus, the output of an LSTM block is potentially provided to two other LSTM blocks, one in the same column but in a higher layer and one in the same layer but in the adjacent column (in the forward direction). It will be appreciated that LSTM blocks in the upper layer and in the final column (the column of event T) provide their output vectors to only one other LSTM block. The LSTM blocks in the upper layer (e.g., the layer furthest from the input of the event representation) pass their output vectors forward to one adjacent LSTM block in that same layer.

The LSTM blocks in the final column pass their output vectors upward to one LSTM block in the next layer along the column. The final block of the neural network 222—the block in the highest layer and the final column, shown here as $LSTM_{TB}$—thus receives two input vectors that collectively reflect calculations performed in all columns and all layers of the neural network 222, and the output of this final block is the output of the neural network 222.

At each iteration of either training or inference of the DSI estimation engine 220, the neural network 222 computes the functions within the LSTM memory blocks to generate new cell state and output scores. These new cell state and output scores are transmitted to subsequent iterations of the LSTM memory cells to be used in the computation of functions within the LSTM memory cells in subsequent time steps, as well as passed to LSTM blocks in the next layer and/or adjacent column of LSTM blocks. The new cell state and output scores that are passed to the LSTM memory cells for the next time step retains information on the input vectors of the previous time step, and thus, the LSTM is trained to associate output vectors with the input vectors.

Portion 270 depicts further details of an example of LSTM memory block 272 that can be used with the neural network 222 of portion 260. Portion 270 illustrates one example of how an LSTM memory cell can use the cell state and output score to allow information in previous time steps to persist and be used in its current computation. LSTM memory cells are a type of RNN, and as such they form networks with "loops" in them that allow information to persist from use to use. A RNN (and LSTM) can be thought of as multiple copies of the same network, each passing a message to a successor. To illustrate this concept, portion 270 illustrates the same LSTM memory block 272 at time t as well as this same cell at times t−1 and t+1.

The example LSTM memory block 272 receives the output cell state $C_{t-1}$ and output vector hidden state $h_{t-1}$ from itself at a previous time step, thus retaining values of prior states. The example LSTM memory block 272 also receives input $x_t$, which represents either an input (e.g., an input based on a vector representation 216) or the output of a different LSTM memory cell in the neural network 222.

The cell state, represented by the horizontal line running through the top of the LSTM memory cell 272 in FIG. 2B, can be considered as the memory of the LSTM that allows information to be stored in the LSTM across periods of time. The cell state encodes, at every time step, knowledge of inputs that have been observed up to that step.

Information can flow along the cell state unchanged, though the LSTM memory block 272 does have the ability to remove or add information to the cell state, regulated by structures called gates. The LSTM memory block 272 includes a forget gate $f_t$, an input gate $i_t$, and an output gate $o_t$. The forget gate $f_t$ determines whether the current content of the cell state will be forgotten or erased, the input gate $i_t$ determines whether the input $x_t$ will be stored in the cell state, and the output gate $o_t$ determines whether current cell state contents will be output.

The forget gate $f_t$ is a sigmoid (sigmoidal non-linearity) layer, and its output values determine how long data remains in the LSTM memory block 272 by specifying how much of the cell state and output vector from the previous iteration of the LSTM memory block 272 will be used to influence the current cell state. The forget gate $f_t$ can maintain information within the LSTM memory block 272 for short or long periods of time, or time steps. The value of the forget gate $f_t$ can be calculated as $f_t = \sigma(h_{t-1} * x_t)$.

The input gate $i_t$ is a sigmoid layer, and its output values represent a determination of an amount (e.g., percentage) of the input that will be processed by the LSTM memory block 272. The sigmoid layer of the input gate controls how much of the cell state and output scores of previous time steps will be used in the LSTM memory cell computation. The value of the input gate $i_t$ can be calculated as $i_t = \sigma(h_{t-1} * x_t)$.

The tanh (hyperbolic tangent non-linearity) layer creates a vector of new candidate values, $\tilde{C}_t$, that could be added to the state. The candidate state value can be calculated as $\tilde{C}_t = \tanh(h_{t-1} * x_t)$. The tanh layer can apply a hyperbolic tangent function that pushes the values of $h_{t-1} * x_t$ between −1 and 1.

The output gate $o_t$ is a sigmoid layer, and its output values determine how much of the processed information will be outputted from the LSTM memory block 272. Specifically, the sigmoid values of the output gate control how much of the output vector will be output from the LSTM memory block 272. The output gate $o_t$ can be calculated as $o_t = \sigma(h_{t-1} * x_t)$.

The above-described calculations are used to update the old cell state $C_{t-1}$ into the new cell state $C_t$. The new cell state $C_t$ can be determined as $C_t = i_t * \tilde{C}_t + f_t * C_{t-1}$. The new cell state $C_t$ is output to a future iteration of the LSTM memory block 272.

The new cell state $C_t$ is also put through another tanh layer (to push the values to be between −1 and 1) and then multiplied by the output of the sigmoid gate. The new output vector $h_t$ for the LSTM memory block 272 can thus be determined as $h_t = o_t * \tanh(C_t)$. The new output vector $h_t$ for the LSTM memory block 272 is passed to the next LSTM block(s) in the neural network 222 (e.g., the next block in the column corresponding to an event, the adjacent block in a row/layer) or output as the target outcome probability 225 if the LSTM memory block 272 is the final memory block in the neural network 222.

The three gates of the LSTM memory block 272 (input gate $i_t$, forget gate $f_t$, output gate $o_t$) can each include a sigmoid layer and a multiplication operation. These sigmoid layers can be used as described above to control the gates. For example, a sigmoid layer outputs a number between zero and one for each number in the input vector. These output values can control a gate by acting as weights that determine whether to allow the full, part, or none of the corresponding vector value to pass when multiplied by the corresponding vector value. Thus, the output of the gates can range from allowing nothing (sigmoid layer value is 0 and thus the input to the multiplication operation is multiplied with 0) to everything (sigmoid layer value is 1 and thus the input to the multiplication operation is multiplied with 1). As described herein, these LSTM weights can be learned via training of the neural network 222.

Other variations on the illustrated LSTM architecture can also be used within the neural network 222. For example, one variation can use coupled forget and input gates. Another variation can add "peephole connections" that allow the gate layers to access information from the cell state. Another variation is the gated recurrent unit (GRU) that combines the forget and input gates into a single "update gate" and also merges the cell state and hidden state, among other changes. In addition, other types of RNN architectures can be used in place of the LSTM network in other implementations.

Example Flowcharts

Figure 3:
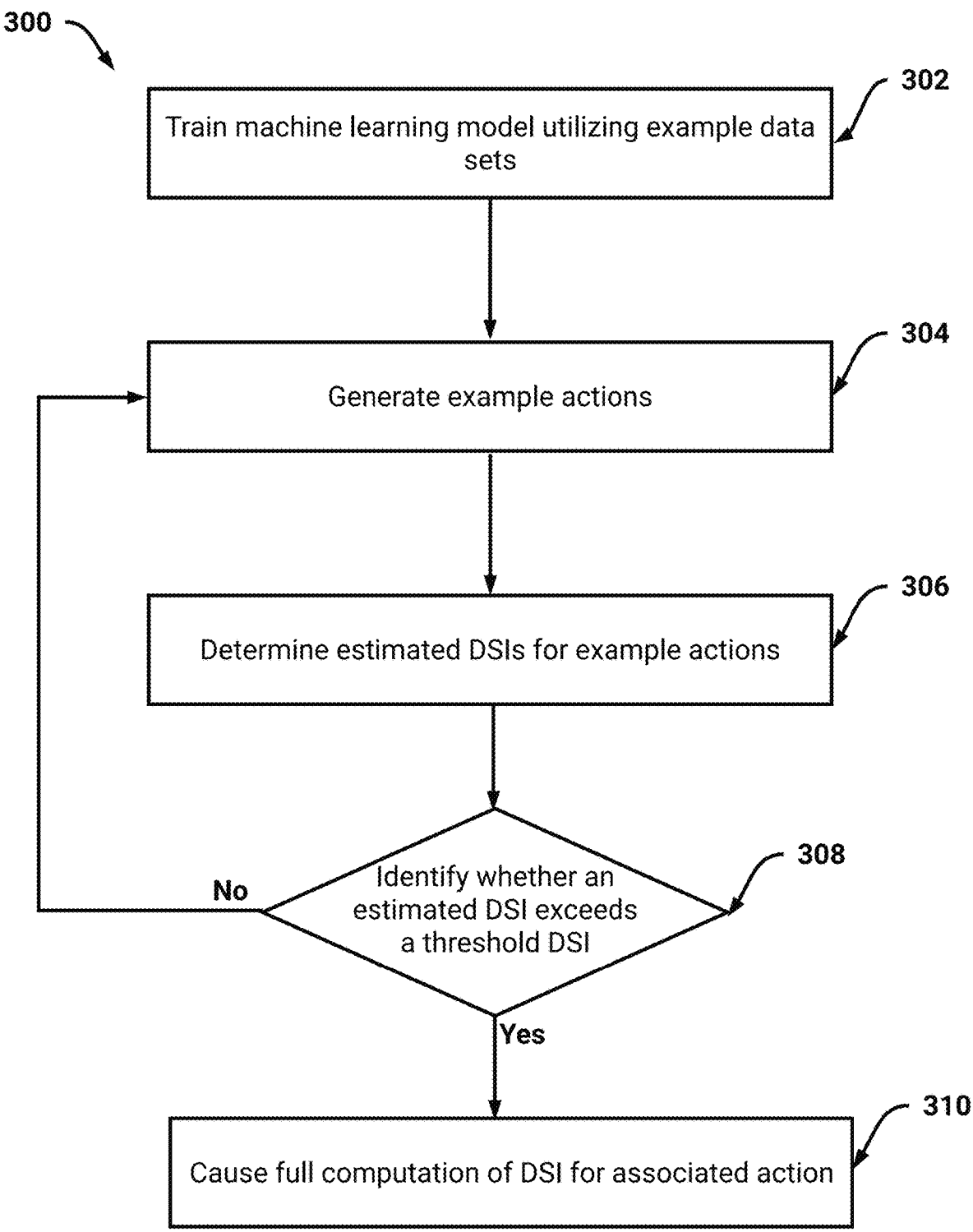
FIG. 3 illustrates is a flowchart of an example process for generating estimated DSIs of example actions.

FIG. 3 illustrates is a flowchart of an example process 300 for generating estimated down-stream impacts (DSIs) of actions. For convenience, the process 300 will be described as being performed by a system of one or more computers (e.g., the DSI learning and evaluation system 100). In some embodiments, the system ay perform the process 300 automatically (e.g., without user interaction). In these embodiments, the system may generate one or more seeds (e.g., without user interaction), or access stored information identifying seeds, and generated example actions based on the one or more seeds. Furthermore, the system may estimate DSIs. The system may then automatically notify one or more users of at least a subset of the results (e.g., estimated DSIs greater than a threshold measure), trigger full computations of one or more of the estimated DSIs, and so on.

At block 302, the system trains machine learning models utilizing example data sets. As described in FIGS. 2A-2B, the system may train neural networks (e.g., recurrent neural networks). The system can train a first neural network (e.g., the action generating engine) to generate actions based on seeds and can train a second neural network (e.g., the DSI estimation engine) to estimate DSIs of the generated actions.

At block 304, the system generates example actions 304 using the trained action generating engine 210. The system may generate actions according to a received seed. For example, the seed may be specified by a user. In this way, users may query the system to generate actions which are of interest to the users. Using the above-described machine learning model, the system may assign words that are suitable based on the seed. Additionally, the system may generate actions without a user-specified seed. For example, the system may generate its own seed via identifying a verb and subject (or other corresponding parts of speech in a phrase). The verb may be obtained from actions performed by users. As another example, the system may obtain information identifying the actions available to users. In this way, the system may select a verb, and utilizing contextual information may then select an appropriate subject.

At block 306, the system determines estimated DSIs for the example actions using the trained DSI estimation engine 220. The system may convert the example actions into respective vector representation. The system may then evaluate the vector representations using the above-described machine learning model.

At block 308, the system identifies whether an estimated DSI exceeds a threshold measure. As described above, the threshold measure may be user-selectable. For example, a user may specify a seed along with the threshold measure. In response, the system may flag any example actions associated with estimated DSIs greater than the threshold measure. Some implementations may instead run batch analysis of many simulated actions, and can identify a top K or percentage of the actions based on ranked DSIs.

If the system does not identify any estimated DSIs greater than the threshold measure, the system may cause generation of new example actions. For example the system may generate, or request, a new seed. Optionally, the system may have stored thousands, hundreds of thousands, and so on, created seeds. In this way, the system may loop through the seeds and identify any example actions which are associated with estimated DSIs greater than the threshold measure. Optionally a user may request that the top estimated DSIs (e.g., a threshold number of the highest estimated DSIs) be presented to the user, even if they are below the threshold measure. In this example, the user may view the example actions which are associated with the top estimated DSIs.

In some embodiments, the system may cause full computation of one or more estimated DSIs which are below a particular threshold measure. For example, if an estimated DSI of a user action is below the particular threshold measure (e.g., 1 or 2 in a decile scheme) the system may perform full computations of the DSI. In this example, the user action may be associated with a potential negative value action. This user action may therefore benefit from being monitored in an attempt to reduce a likelihood of its occurrence.

At block 310, the system causes full computation of one or more DSIs. Optionally, for an estimated DSI which exceeds the threshold measure, the system may determine the actual (e.g., non-estimated) DSI for the associated estimated high value action. Advantageously, the system may utilize the actual DSI to update the machine learning model described above. For example, this information may be utilized to adjust parameters of a neural network (e.g., weights between neurons) or optionally to adjust hyperparameters of the neural network.

Optionally, the system may enable an example action. For example, the example action may not have been capable of being performed yet. Thus, the system may modify one or more web pages, mobile applications, web applications, and so on to enable users to perform the example action. The system may then record a number of times the example action is performed. Additionally, the system may maintain one or more databases which store actions, associated fully computed DSIs, and a respective number of times the actions were performed. The system may provide access to these databases. For example, a user may view a graphical representation of the stored information, such as a listing of the stored actions and associated information (e.g., DSIs, numbers of times the actions were performed). Optionally, the user may cause the sorting of the stored actions according to associated DSI. Optionally, the user may cause the sorting of the stored actions according to a combination (e.g., multiplication) of associated DSI and a number of times an action was performed.

Figure 4:
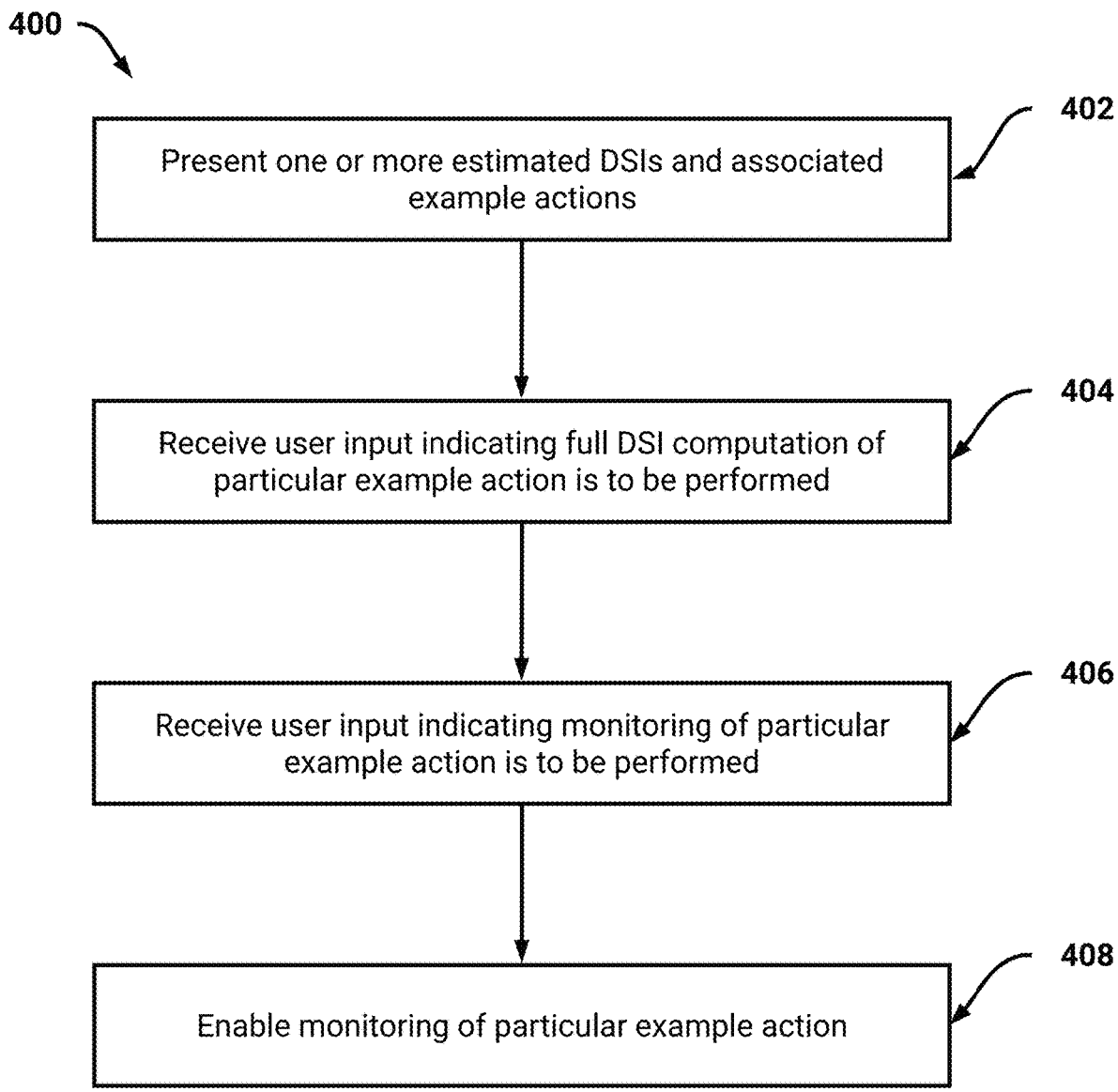
FIG. 4 illustrates is a flowchart of an example process for enabling monitoring of an example action.

FIG. 4 illustrates is a flowchart of an example process 400 for enabling monitoring of an example action. For convenience, the process 400 will be described as being performed by a user device of one or more processors (e.g., the user device 150).

At block 402, the user device presents a user interface including one or more estimated DSIs and associated actions. The user interface, which is further described above with respect to FIGS. 1A-1C, may present the information in response to a user specifying a particular action or a seed.

At block 404, the user device receives user input indicating full DSI computation of a particular action is to be performed. As illustrated in FIG. 1C, the user may request that a particular action be submitted for a full DSI computation. A system (e.g., the DSI evaluation and learning system 100) may then identify all, or a threshold number of, occurrences of the particular action. Based on these identified occurrences, the system may determine the actual DSI for the particular action. In this way, the actual DSI for the particular action may be determined. Optionally, the user interface may highlight, or otherwise identify, actions with estimated DSIs above a threshold measure. The user may therefore select from among these actions.

At block 406, the user device receives user input indicating monitoring of the particular action is to be performed. As illustrated in FIG. 1C, the user may provide user input via the user interface to enable monitoring of the particular action. In this way, the system may monitor for any occurrences of the particular action which may occur in the future.

At block 408, the user device enables monitoring of the particular example action. The system may receive information from the user device confirming monitoring. The system may then initiate the monitoring, and, for example, aggregate user information of users to determine occurrences of the particular action.

Example System

Figure 5:
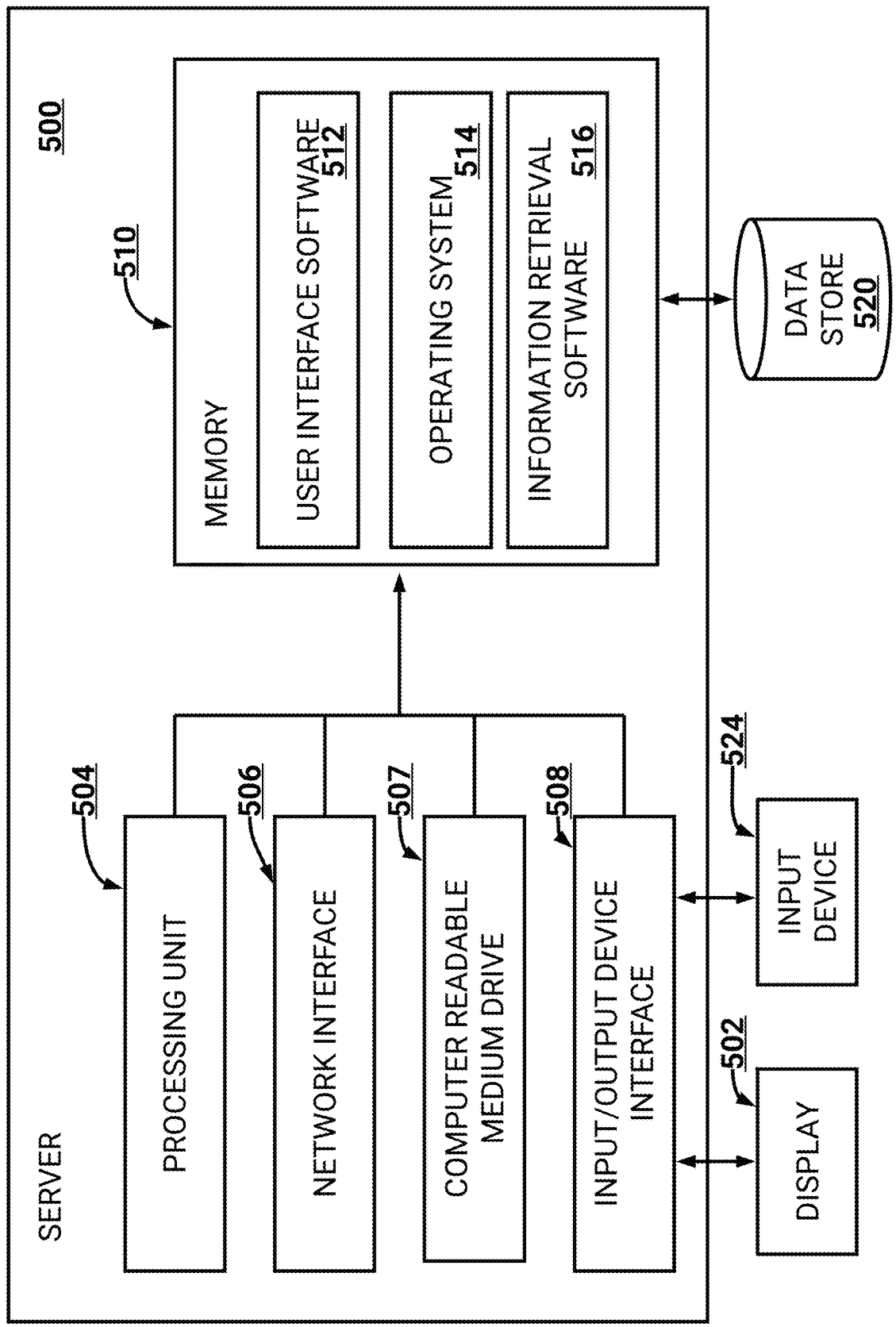
FIG. 5 is a block diagram depicting an illustrative configuration of one embodiment of a server than may implement elements of the DSI learning and evaluation system described herein.

FIG. 5 is a block diagram depicting an illustrative configuration of one embodiment of a server 500 than may implement elements of the DSI learning and evaluation system 100. The general architecture of server 500 depicted in FIG. 5 includes an arrangement of computer hardware and software components that may be used to implement aspects of the present disclosure. As illustrated, the server 500 includes a processing unit 504, a network interface 506, a computer readable medium drive 507, an input/output device interface 520, a display 502, and an input device 524, all of which may communicate with one another by way of a communication bus. The network interface 506 may provide connectivity to one or more networks or computing systems, such as to one or more clients, indexing systems, data storage systems, and so on. The processing unit 504 may thus receive information and instructions from other computing systems or services via a network. The processing unit 504 may also communicate to and from memory 510 and further provide output information for an optional display 502 via the input/output device interface 520. The input/output device interface 520 may also accept input from the optional input device 524, such as a keyboard, mouse, digital pen, etc. In some embodiments, the server 500 may include more (or fewer) components than those shown in FIG. 5. For example, some embodiments of the server 500 may omit the display 502 and input device 524, while providing input/output capabilities through one or more alternative communication channel (e.g., via the network interface 506).

The memory 510 may include computer program instructions that the processing unit 504 executes in order to implement one or more embodiments. The memory 510 generally includes RAM, ROM, and/or other persistent or non-transitory memory. The memory 510 may store an operating system 514 that provides computer program instructions for use by the processing unit 504 in the general administration and operation of the server 500. The memory 510 may further include computer program instructions and other information for implementing aspects of the present disclosure. For example, in one embodiment, the memory 510 includes user interface software 512 that generates user interfaces (and/or instructions therefor) for display upon a computing device, e.g., via a navigation interface such as a web browser installed on the computing device. In addition, memory 510 may include or communicate with one or more auxiliary data stores, such as data store 520, which may correspond to any persistent or substantially persistent data storage, such as a hard drive (HDD), a solid-state drive (SDD), network attached storage (NAS), a tape drive, or any combination thereof.

In addition to the user interface module 512, the memory 510 may include information retrieval software 516 that may be executed by the processing unit 504. In one embodiment, the information retrieval software 516 implements various aspects of the present disclosure. For example, generating example actions and determining estimated down-stream impacts (DSIs) of the example actions. While the information retrieval software 516 is shown in FIG. 5 as part of the server 500, in other embodiments, all or a portion of the software may be implemented by alternative computing devices, such as virtual computing devices within a hosted computing environment.

Each of the processes, methods, and algorithms described in the preceding sections may be embodied in, and fully or partially automated by, code modules executed by one or more computer systems or computer processors comprising computer hardware. The code modules (or "engines") may be stored on any type of, one or more, non-transitory computer-readable media (e.g., a computer storage product) or computer storage devices, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module," as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop-down menu, a tool bar, a pop-up menu, interactive voice response system, or otherwise.

The various features and processes described herein may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y or Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y or at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated herein, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method implemented by a server system, the method comprising:
    obtaining a seed specifying a portion of an action for evaluation with respect to a networked computing environment;
    completing a description of the action by providing a first recurrent neural network (RNN) with the seed to generate one or more additional words, and by creating the description as a phrase including the seed and the one or more additional words, wherein the action represented by the description is not yet enabled in the networked computing environment;
    converting the description into a numerical representation;
    determining an estimated down-stream impact (DSI) associated with the action by providing the numerical representation of the description to a second RNN to predict the estimated DSI, the estimated DSI indicating an estimated measure of impact to the networked computing environment which would be caused by performance of the action after enabling the action; and
    causing output of an interactive user interface including information representing the action and the estimated DSI.

2. The method of claim 1, wherein the seed is obtained as user input from the user device, or wherein the seed is generated, by the server system, based on search queries provided by users.

3. The method of claim 1, wherein the first RNN comprises a long short-term memory network.

4. A system comprising one or more computers and computer storage media storing instructions that, when executed by the one or more computers, cause the computers to perform operations comprising:
    obtaining a seed specifying a portion of an action performable by a user with respect to a networked computing environment;
    completing a description of the action by providing a first recurrent neural network (RNN) with the seed to generate one or more additional words, and by creating the description as a phrase including the seed and the one or more additional words;
    determining an estimated down-stream impact (DSI) associated with the action by providing a numerical representation of the description to a second RNN to predict the estimated DSI, the estimated DSI indicating an estimated measure of impact to the networked computing environment which would be caused by performance of the action; and
    causing output of an interactive user interface including information representing the action and the estimated DSI.

5. The system of claim 4, wherein the seed is obtained as user input from the user device, or wherein the seed is generated, by the system, based on search queries provided by users.

6. The system of claim 4, wherein the first RNN comprises a long short-term memory network.

7. The system of claim 4, wherein generating the one or more additional words is constrained according to a maximum number of words eligible for inclusion in the description of the action.

8. The system of claim 4, wherein determining an estimated DSI associated with the action comprises:
    evaluating the action utilizing the second RNN, the second RNN trained based on actions being monitored by the system and associated DSI values, wherein the associated DSI values were determined based on aggregating user information associated with users who performed the actions; and
    obtaining, via the second RNN, the estimated DSI associated with the action.

9. The system of claim 8, wherein evaluating the action comprises:
    generating the numerical representation of the description, the numerical representation comprising respective vectors assigned to the words included in the description, and the vectors being assigned with respect to a same vector space; and
    evaluating, by the second RNN, the generated numerical representation, wherein the second RNN is trained based on numerical representations of actions being monitored by the system.

10. The system of claim 4, wherein the operations further comprise:
    identifying that the determined estimated DSI exceeds a threshold measure; and
    causing determination of a DSI value, associated with the action, based on aggregating user information associated with users who performed the action.

11. The system of claim 4, wherein the action performable by the user is with respect to an electronic marketplace implemented by the networked computing environment.

12. Non-transitory computer storage media storing instructions that when executed by a system of one or more computers, cause the one or more computers to perform operations comprising:
    obtaining a seed specifying a portion of an action performable with respect to a networked computing environment;
    completing a description of the action by providing a first machine learning (ML) model with the seed to generate one or more additional words, and by creating the description as a phrase including the seed and the one or more additional words;
    determining an estimated down-stream impact (DSI) associated with the action by providing a numerical representation of the description to a second ML model to predict the estimated DSI, the estimated DSI indicating an estimated measure of impact to the networked computing environment which would be caused by performance of the action; and
    causing output of an interactive user interface including information representing the action and the estimated DSI.

13. The computer storage media of claim 12, wherein the seed is received as user input from the user device, or wherein the seed is generated based on search queries.

14. The computer storage media of claim 12, wherein the first ML model or the second ML model comprises a recurrent neural network (RNN).

15. The system of claim 14, wherein the RNN comprises a long short-term memory network.

16. The computer storage media of claim 12, wherein generating the one or more additional words is constrained according to a maximum number of words eligible for inclusion in the description of the action.

17. The computer storage media of claim 12, wherein determining an estimated DSI associated with the action comprises:

evaluating the action utilizing the second RNN, the second RNN trained based on actions being monitored by the system and associated DSI values, wherein the associated DSI values were determined based on aggregating user information associated with users who performed the actions; and obtaining, via the second RNN, the estimated DSI associated with the action.

18. The computer storage media of claim 17, wherein evaluating the action comprises:

generating the numerical representation of the description, the numerical representation comprising respective vectors assigned to the words included in the description, and the vectors being assigned with respect to a same vector space; and evaluating, by the second RNN, the generated numerical representation, wherein the second RNN is trained based on numerical representations of actions being monitored by the system.

19. The computer storage media of claim 12, wherein the operations further comprise:

identifying that the determined estimated DSI exceeds a threshold measure; and causing determination of a DSI value, associated with the action, based on aggregating user information associated with users who performed the action.

20. The computer storage media of claim 12, wherein the action is performable by a user with respect to an electronic marketplace implemented by the networked computing environment.

* * * * *